(12) United States Patent
Jia et al.

(10) Patent No.: US 9,883,200 B2
(45) Date of Patent: Jan. 30, 2018

(54) METHOD OF ACQUIRING NEIGHBORING DISPARITY VECTORS FOR MULTI-TEXTURE AND MULTI-DEPTH VIDEO

(71) Applicant: Beijing University of Technology, Beijing (CN)

(72) Inventors: Kebin Jia, Beijing (CN); Zuocheng Zhou, Beijing (CN); Pengyu Liu, Beijing (CN); Yibai Wang, Beijing (CN)

(73) Assignee: Beijing University of Technology, Beijing (CN)

( * ) Notice: Subject to any disclaimer, the term of this patent is extended or adjusted under 35 U.S.C. 154(b) by 0 days.

(21) Appl. No.: 15/316,009

(22) PCT Filed: Apr. 30, 2015

(86) PCT No.: PCT/CN2015/077944
§ 371 (c)(1),
(2) Date: Dec. 2, 2016

(87) PCT Pub. No.: WO2016/155070
PCT Pub. Date: Oct. 6, 2016

(65) Prior Publication Data
US 2017/0094306 A1 Mar. 30, 2017

(30) Foreign Application Priority Data
Apr. 1, 2015 (CN) .......................... 2015 1 0152909

(51) Int. Cl.
*H04N 19/52* (2014.01)
*H04N 19/597* (2014.01)
(Continued)

(52) U.S. Cl.
CPC .......... *H04N 19/52* (2014.11); *H04N 19/146* (2014.11); *H04N 19/597* (2014.11); *H04N 19/172* (2014.11)

(58) Field of Classification Search
CPC ...... H04N 7/50; H04N 7/26244; H04N 5/145; H04N 7/26765; H04N 7/26015
(Continued)

(56) References Cited

U.S. PATENT DOCUMENTS

2005/0069211 A1* 3/2005 Lee ...................... H04N 19/172
382/239
2013/0271565 A1* 10/2013 Chen .................. H04N 13/0048
348/43
(Continued)

FOREIGN PATENT DOCUMENTS

CN 1767655 A 5/2006
CN 103533361 A 1/2014
(Continued)

OTHER PUBLICATIONS

Shahriyar et al, Efficient Coding of Depth Map by Exploiting Temporal Correlation, 2014.*
(Continued)

*Primary Examiner* — Shan E Elahi

(57) ABSTRACT

The present disclosure relates to a method of acquiring neighboring disparity vectors for multi-texture and multi-depth video. The method belongs to the area of 3D-HEVC video coding technology. The method includes changing the standard associated with a disparity vector that is first searched as a final disparity vector. By deleting location which is minimum searched in candidate space and time location of the coding unit next to current coding unit to divide candidate space and time location of the coding unit into groups, the method takes searched disparity vector that is combined based on the proportion of adoption rate as final (Continued)

disparity vector. The method improves coding quality and at the same time maintaining origin fast algorithm efficiency. The embodiments of the present disclosure improve coding quality at least 0.05% and at the same time maintain origin fast algorithm efficiency while the decoding time is decreased to 97.1%.

1 Claim, 10 Drawing Sheets

(51) Int. Cl.
*H04N 19/146* (2014.01)
*H04N 19/172* (2014.01)

(58) Field of Classification Search
USPC .................................................. 375/240.16
See application file for complete search history.

(56) References Cited

U.S. PATENT DOCUMENTS

| | | | |
|---|---|---|---|
| 2013/0336405 A1 | 12/2013 | Chen et al. | |
| 2014/0078251 A1* | 3/2014 | Kang | H04N 13/0048 348/43 |
| 2014/0133573 A1* | 5/2014 | Hsu | H04N 19/176 375/240.18 |
| 2014/0355666 A1* | 12/2014 | Zhang | H04N 19/593 375/240.02 |
| 2015/0003512 A1* | 1/2015 | Deng | H04N 19/187 375/240.02 |
| 2015/0063464 A1* | 3/2015 | Chen | H04N 19/50 375/240.25 |
| 2016/0057453 A1* | 2/2016 | Chang | H04N 19/597 375/240.12 |
| 2016/0073132 A1* | 3/2016 | Zhang | H04N 19/597 375/240.12 |
| 2016/0173888 A1* | 6/2016 | Park | H04N 19/597 375/240.08 |

FOREIGN PATENT DOCUMENTS

| | | |
|---|---|---|
| CN | 100463527 A | 3/2014 |
| CN | 104365103 A | 2/2015 |
| EP | 2862355 A1 | 4/2015 |
| WO | WO2013188745 A1 | 12/2013 |
| WO | WO2014047351 A2 | 3/2014 |

OTHER PUBLICATIONS

Purica et al, Multiview Plus Depth Video Coding With Temporal Prediction View Synthesis, Feb. 2016.*
Domanski et al, Coding of multiple video + depth using HEVC technology and reduced representations of side views and depth maps, 2012.*

* cited by examiner

## METHOD OF ACQUIRING NEIGHBORING DISPARITY VECTORS FOR MULTI-TEXTURE AND MULTI-DEPTH VIDEO

CROSS REFERENCE TO RELATED APPLICATION

This application is a national stage application of International application number PCT/CN2015/077944, filed Apr. 30, 2015, titled "A method of acquiring neighboring disparity vectors for multi-texture and multi-depth video," which claims the priority benefit of Chinese Patent Application No. 201510152909.3, filed on Apr. 1, 2015, which is hereby incorporated by reference in its entirety.

TECHNICAL FIELD

The present disclosure relates to 3D-HEVC video coding technology, and particularly relates to a new method to of acquiring neighboring disparity vectors for multi-texture and multi-depth video (e.g., 3D-HEVC).

BACKGROUND

There is a great change about video broadcast technology in recent 20 years. For example, from analog television in the $20^{th}$ century to digital television, HDTV and even 3D television we use today, the video broadcast technology is developing to improve the daily life of people. People is no longer satisfied with visual perception brought by traditional 2D video, and 3D video become a heating topic in multimedia information industry due to a sense of immediacy and interactivity. A compressed encoding method of 3D video formatted data containing more texture and depth based on HEVC (HEVC High-Efficiency Video Coding) has been developed by 3DG group of MPEG now. In July 2012, VCEG and MPEG research groups founded JCT-3V group and defined a standard of 3D video coding extension. They disclosed 3D encoding standard 3D-HEVC based on HEVC. The most efficient 3D video manifestation mode used by 3D-HEVC standard is more texture and depth video, which is obtained by more neighbor video cameras (usually shoot 3 texture and 3 depth) shoot from different angles for one sense which is multi-path video compilations with little difference in angle of view. More texture video added with more depth information will describe 3D sense information more specifically and entirely. It is useful for 3D video terminals to generate high-quality stimulation images of random view angles in a wider range of view angles; this high-quality stimulation image is generated by drawing technology of depth stimulation viewpoints and provides binocular display perception and motion parallax perception to provide an immersed viewing perception for users.

Since more texture and depth video has large quantities of data, efficiently compressed encoding has to be processed. Accordingly, researchers use 8×8 to 64×64 quadtree prediction unit construction, 4×4 to 32×32 transform unit size, 36 kinds of an intra-frame prediction mode in multi-angle, adaptive loop filter and more new technology in encoding standard disclosed by 3D-HEVC. At the same time, as for more texture and depth video encoding construction of 3D-HEVC, researchers use more reference frames between viewpoints. The conception of intra-prediction mode is extended as motion prediction encoding mode in the time direction, and disparity prediction mode in the direction of neighboring viewpoint, and the calculation difficulty is improved.

For example, more texture and depth video with 3 texture and 3 depth, as illustrated in FIG. 1, horizontal line represents time direction, vertical lines represents viewpoints direction. Hierarchical frame B to delete redundancy in the time direction is used, and I-P-P structure to delete redundancy information between viewpoints is used in viewpoint direction. The base viewpoint can only use a coding frame inner itself as a reference frame; a dependent viewpoint can use base viewpoint coding frame as reference frame except for using finished coding frame inner itself. For each viewpoint, there is a corresponding depth map characterized by 8 bit. In 3D-HEVC, first, encoding texture map of a base viewpoint, then encoding depth map of base viewpoint, and then encoding texture map and a depth map of dependent viewpoint. Since the depth map needs texture map information to encode, texture map must be coded before the depth map, which is called texture map encoding priority encoding order, as illustrated in FIG. 2.

Disparity vector obtaining is an important technology in more texture and depth 3D-HEVC video coding, and widely used in motion compensation prediction and residual prediction between viewpoints. Disparity vector represents the difference between different video frame at a same time, with current 3D-HEVC standard, disparity vector in a base viewpoint can give prediction unit of dependent viewpoint a motion compensation. In texture map encoding priority encoding order, when encoding prediction unit of dependent viewpoint, the disparity vector used cannot be calculated from corresponding texture map because the corresponding depth map is not input in the coding unit.

The traditional method is provided as follow. Through block estimation and block matching to obtain disparity vector, the method needs related information to decode in the decoding end. If this information is transported in the code stream, extra transportation bit is generated. To avoid this situation, 3D-HEVC introduces a way that estimates depth map from texture map information which is finished the encoding process. To get the depth map, disparity information between the base viewpoint and dependent viewpoint is transformed into depth information. The calculated depth information can be transformed into depth map information of base viewpoint and another dependent viewpoint. During this process, the estimated max depth value in depth map will be transformed into disparity vector; the process is called disparity vector transformation based on the depth map.

There is a large amount of calculation during the process of disparity vector transformation based on the depth map. To decrease calculation complexity, 3D-HEVC introduces simplified obtaining method of disparity vector, which is called disparity vector obtaining method based on neighboring block. Disparity vector obtaining method based on neighboring block using a pre-installed order to search for candidate space and time coding block location, judging if there have a disparity vector information to obtain disparity vector of a current block, coding block in space and time the location is shown in FIG. 3 and FIG. 4. If the searched prediction unit uses disparity compensation prediction or disparity motion compensation prediction technology, there is disparity information in prediction unit, and the first searched disparity vector is used in the process of motion compensation prediction and residual prediction between viewpoints. Searching order is: first searching CRT and BR in a time reference frame, then searching A1, B1, B0, A0 and B2 in space reference frame, and searching motion vector compensation situation of these space reference frames. Disparity vector obtaining method based on neighboring blocks can save at least 8% time compared with disparity vector transformation based on the depth map.

After the disparity vector obtaining method based on neighboring block appeared, 3D-HEVC uses disparity vector obtaining method based on a depth map of neighboring block to improve obtained neighboring disparity vector. The disparity vector obtaining method based on a depth map of the neighboring block takes depth map of base viewpoint to amend disparity vector obtained initially. After obtaining origin disparity vector of neighboring block, a max depth value of base viewpoint depth map is used to amend and get the final disparity vector.

To reduce the process of obtaining disparity vector through transform bit acceleration, some research groups study a fast algorithm for obtaining disparity vector based on neighboring block. For example, Hisilicon disclosed a searching method that skip overlap location in prediction unit, Qualcomm disclosed a method that takes coding unit as minimum algorithm taking the unit, and Samsung disclosed a method that deletes searching location in time and space reference frame (shown as FIG. 5, FIG. 6). Moreover, some research groups disclosed using of variable coding tools to change the coding order of 3D-HEVC.

In conclusion, current amend methods for disparity vector obtaining based on the neighboring block are all aimed at deleting searching location and decreasing searching times. The main problem is: first obtained disparity vector is considered as final disparity vector, searching is stopped, and there may have disparity vector which can be used and maybe better than searched one is not searched and stopped by the whole obtaining process. Accordingly, the present disclosure based on 3D-HEVC disclosed a method changes the rule of first obtained disparity vector as the final disparity vector. Through deleting the location which is minimum searched in neighboring candidate space and time coding unit location, at the same time, grouped neighboring candidate space and time coding unit location, the approach takes the searched disparity vector which is combined according to the proportion of adoption rate as final disparity vector, improving coding quality and at the same time maintaining origin fast algorithm efficiency.

SUMMARY

The present disclosure disclosed a method which is aimed at changing the rule of first obtained disparity vector is final disparity vector based on 3D-HEVC, through deleting the location which is minimum searched in neighboring candidate space and time coding unit location, at the same time, grouped neighboring candidate space and time coding unit location, the approach takes searched disparity vector which is combined according to proportion of adoption rate as final disparity vector, it improves coding quality and at the same time maintaining origin fast algorithm efficiency firstly.

The present disclosure is comprising: it is realized through stimulation with following steps in a computing device.

Step (1) computer initialized: Setting: the computing device may code the base viewpoint of selected sequence and current dependent viewpoint according to general testing condition, use 3D-H EVC's coding software HTM8.0 as coding platform, according to texture map and depth map quantified parameters stipulated by general testing condition consist of four groups, first group (40, 45), second group (35, 42), third group (30, 39), fourth group (25, 34), the first parameter in bracket represents texture map quantified parameters and second parameter in bracket represents depth map quantified parameters, there are four groups in total.

3D-HEVC international video testing sequence standard which takes YUV as format includes: Newspaper_CC (300 frames), GT fly (250 frames), Undo dancer (250 frames), Poznan_Hall2 (200 frames), Poznan_Street (250 frames), Kendo (300 frames), Balloons (300 frames), each testing sequence including 3 texture sequences and 3 corresponding depth sequences; when testing sequences is in coding, the order of 3 input viewpoints of encoder are: 4-2-6, 5-9-1, 5-1-9, 6-7-5, 4-5-3, 3-1-5, 3-1-5 respectively, when coding every viewpoint, the coding order is: first coding texture map and after that coding depth map. For example, when encoding the Newspaper_CC sequence, according to general testing conditions, after initialization of texture map and its' corresponding depth map quantify parameter group (40, 45), the computing device may operate HTM coding software, load No. 4 texture map of base viewpoint sequence of 1st frame to encode, then load No. 4 depth map of base viewpoint sequence of $1^{st}$ frame to encode, after finishing encoding process of base viewpoint of $1^{st}$ frame, load No. 2 texture map of dependent viewpoint sequence of $1^{st}$ frame to encode, and then load No. 2 depth map of dependent viewpoint sequence of $1^{st}$ frame to encode, at last load No. 6 texture map of dependent viewpoint sequence of $1^{st}$ frame to encode, after that load No. 6 depth map of dependent viewpoint sequence of $1^{st}$ frame to encode. Accordingly, the 3 viewpoint sequences encoding processes of the $1^{st}$ frame is finished, the computing device may load 300 frames successively to finish the coding process of Newspaper_CC sequence under the condition of quantifying parameter group (40, 45). Then according to general testing conditions, after initialization of texture map and its' corresponding depth map quantify parameter group (35, 42), the computing device may operate HTM coding software, load No. 4 texture map of base viewpoint sequence of $1^{st}$ frame to encode, then load No. 4 depth map of base viewpoint sequence of $1^{st}$ frame to encode, after finishing encoding process of base viewpoint of $1^{st}$ frame, load No. 2 texture map of dependent viewpoint sequence of $1^{st}$ frame to encode, and then load No. 2 depth map of base viewpoint sequence of $1^{st}$ frame to encode, at last load No. 6 texture map of dependent viewpoint sequence of $1^{st}$ frame to encode, after that load No. 6 depth map of dependent viewpoint sequence of $1^{st}$ frame to encode. Accordingly, the 3 viewpoint sequences encoding processes of the $1^{st}$ frame is finished, the computing device may load 300 frames successively to finish the coding process of Newspaper_CC sequence under the condition of quantifying parameter group (35, 42). And the computing device may finish the coding process of Newspaper_CC sequence under the condition of quantifying parameter group (30, 39) and (25, 34). Another example: when encoding GT fly sequence, after initialization of texture map and its' corresponding depth map quantify parameter group (40, 45), the computing device may operate HTM coding software, load No. 5 texture map of base viewpoint sequence of $1^{st}$ frame to encode, then load No. 5 depth map of base viewpoint sequence of $1^{st}$ frame to encode, after finishing encoding process of base viewpoint of 1st frame, load No. 9 texture map of dependent viewpoint sequence of $1^{st}$ frame to encode, and then load No. 9 depth map of dependent viewpoint sequence of $1^{st}$ frame to encode, at last load No. 1 texture map of dependent viewpoint sequence of $1^{st}$ frame to encode, after that load No. 1 depth map of dependent viewpoint sequence of 1st frame to encode. Accordingly, the 3 viewpoint sequences encoding processes of the 1st frame is finished, the computing device may load 250 frames successively to finish the coding process of GT fly sequence under the condition of quantifying parameter group (40, 45). Then according to general testing conditions, after initialization of texture map and its' corresponding depth map quantify parameter group (35, 42), the computing device may operate HTM coding software, load No. 5 texture map of base viewpoint sequence of 1st frame to encode, then load No. 5 depth map of base viewpoint sequence of 1st frame to encode, after finishing encoding process of base viewpoint of 1st frame, load No. 9 texture map of dependent viewpoint sequence of 1st frame to encode, and then load No. 9 depth map of dependent viewpoint sequence of 1st frame to encode, at last load No. 1 texture map of dependent viewpoint sequence of 1st frame to encode, after that load No. 1 depth map of dependent viewpoint sequence of 1st frame to encode. Accordingly, the 3 viewpoint sequences encoding processes of the 1st frame is finished, the computing device may load 250 frames successively to finish the coding process of GT fly sequence under the condition of quantifying parameter group (35, 42). And the computing device may finish the coding process of GT fly sequence under the condition of quantifying parameter group (30, 39) and (25, 34).

Step (2), using HTM8.0 treat 3D-HEVC international video testing sequence standard Newspaper_CC, GT fly, Undo dancer, Poznan_Hall2, Poznan_Street, Kendo, Balloons, select first "n" frame base viewpoint and dependent viewpoint described before to encode, n is nature number and 40≤n≤60, the coding order for each viewpoint is: first coding texture map and after that coding depth map. During the coding process of first n frame, using entire location searching method for location of candidate space and time coding unit neighboring with current coding unit, while at the same time, the computing device may extract information of disparity vector adoption rate of candidate space and time coding unit neighboring with current coding unit, includes: detection of whether CTR, BR of candidate time coding location and A1, B1, B0, A0, B2 of candidate space coding location have disparity vector or disparity vector form motion compensation prediction, the information of disparity vector or disparity vector form motion compensation prediction is found from all candidate space and time coding unit neighboring with current coding unit, calculate the sum-of-squared differences of disparity reference frame corresponding to this information above, according to the information of sum-of-squared differences to count disparity vector adoption rate found from all candidate space and time coding unit location neighboring with current coding unit. For example, when coding first n frames (n=40) of Newspaper_CC sequence under quantify parameter group (40, 45), the computing device may operate HTM coding software on computer, when coding its' dependent viewpoint, load texture map of dependent viewpoint in first frame, and then load first coding block of current texture map, search if there have disparity vector in coding unit location CTR and BR corresponding to first coding block in reference frame in time direction, after that search if there have disparity vector in coding unit location A1, B1, B0, A0 and B2 in reference frame in space direction, search if there have motion compensation prediction disparity vector in coding unit location A1, B1, B0, A0 and B2 in reference frame in space direction, such as disparity vector is found in A0 and A1 in the first block, so according to disparity vector in A0 and A1 location to find corresponding coding unit in respectively to do the calculation of sum-of-squared differences, if sum-of-squared differences in A1 location is minimum, the computing device may mark A1 location as adopt one time. Load all coding block in the first frame successively to finish counting of adoption times of texture map in first frame dependent viewpoint. After coding texture map, doing depth map coding, the computing device may use this order to load first 40 frames to finish the counting process of Newspaper_CC sequence in quantifying parameter group (40, 45). Next, when coding first n frames (n=40) of Newspaper_CC sequence under quantify parameter group (35, 42), the computing device may operate HTM coding software on computer, when coding its' dependent viewpoint, load texture map of dependent viewpoint in first frame, and then load first coding block of current texture map, search if there have disparity vector in coding unit location CTR and BR corresponding to first coding block in reference frame in time direction, after that search if there have disparity vector in coding unit location A1, B1, B0, A0 and B2 in reference frame in space direction, search if there have motion compensation prediction disparity vector in coding unit location A1, B1, B0, A0 and B2 in reference frame in space direction, such as disparity vector is found in A0 and A1 in the first block, so according to disparity vector in A0 and A1 location to find corresponding coding unit in respectively to do the calculation of sum-of-squared differences, if sum-of-squared differences in A1 location is minimum, the computing device may mark A1 location as adopt one time. the computing device may Load all coding block in the first frame successively to finish counting of adoption times of texture map in first frame dependent viewpoint. After coding texture map, the computing device may perform depth map coding, using this order to load first 40 frames to finish the counting process of Newspaper_CC sequence in quantifying parameter group (35, 42). Then finish the counting process of Newspaper_CC sequence in quantifying parameter group (30, 39) and (25, 34), at last, the computing device may take adoption times of all location divide total times to get adoption rate. Another example is, when coding first n frames (n=40) of GT fly sequence under quantify parameter group (40, 45), the computing device may operate HTM coding software on computer, when coding its' dependent viewpoint, load texture map of dependent viewpoint in the first frame, and then load first coding block of current texture map, search if there have disparity vector in coding unit location CTR and BR corresponding to first coding block in reference frame in time direction, after that search if there have disparity vector in coding unit location A1, B1, B0, A0 and B2 in reference frame in space direction, search if there have motion compensation prediction disparity vector in coding unit location A1, B1, B0, A0 and B2 in reference frame in space direction, such as disparity vector is found in A0 and A1 in the first block; so according to disparity vector in A0 and A1 location, the computing device may find corresponding coding unit in respectively to do the calculation of sum-of-squared differences, if sum-of-squared differences in A1 location is minimum, mark A1 location as adopted one time. the computing device may load all coding block in the first frame successively to finish counting of adoption times of texture map in first frame dependent viewpoint. After coding texture map, doing depth map coding, the computing device may use this order to load first 40 frames to finish the counting process of GT fly sequence in quantifying parameter group (40, 45). Next, when coding first n frames (n=40) of GT fly sequence under quantify parameter group (35, 42), the computing device may operate HTM coding software on computer, when coding its' dependent viewpoint, load texture map of dependent viewpoint in first frame, and then load first coding block of current texture map, search if there have disparity vector in coding unit location CTR and BR corresponding to first coding block in reference frame in time direction, after that search if there have disparity vector in coding unit location A1, B1, B0, A0 and B2 in reference frame in space direction, search if there have motion compensation prediction disparity vector in coding unit location A1, B1, B0, A0 and B2 in reference frame in space direction, such as disparity vector is found in A0 and A1 in the first block, so according to disparity vector in A0 and A1 location to find corresponding coding unit in respectively to do the calculation of sum-of-squared differences, if sum-of-squared differences in A1 location is minimum, the computing device may mark A1 location as adopt one time. the computing device may load all coding block in the first frame successively to finish counting of adoption times of texture map in first frame dependent viewpoint. After coding texture map, the computing device may perform depth map coding, using this order to load first 40 frames to finish the counting process of Newspaper_CC sequence in quantifying parameter group (35, 42). Then finish the counting process of Newspaper_CC sequence in quantifying parameter group (30, 39) and (25, 34), at last, takes adoption times of all location divide total times to get adoption rate. The counting results of adoption rate in each location are shown in table 1 and 2 below.

TABLE 1 counting results of adoption rate of candidate coding unit in space location

| | counting results of the adoption rate of candidate coding unit in space location (%) | | | | |
|---|---|---|---|---|---|
| | A0 | A1 | B0 | B1 | B2 |
| Newspaper_CC | 30.1% | 65.7% | 3.0% | 0.9% | 0.2% |
| GT_Fly | 24.2% | 66.7% | 6.0% | 2.1% | 1.0% |
| Undo_dancer | 26.3% | 60.1% | 8.2% | 3.6% | 1.8% |
| Poznan_Hall2 | 30.2% | 58.6% | 7.2% | 3.0% | 1.0% |
| Poznan_Street | 25.6% | 63.7% | 5.2% | 3.6% | 1.9% |
| Kendo | 30.5% | 62.1% | 5.3% | 1.4% | 0.7% |
| Balloons | 28.6% | 59.3% | 8.4% | 2.3% | 1.4% |
| average | 27.9% | 62.3% | 6.2% | 2.4% | 1.1% |

TABLE 2 counting results of adoption rate of candidate coding unit in time location

| | counting results of the adoption rate of candidate coding unit in time location (%) | |
|---|---|---|
| | CTR | BR |
| Newspaper_CC | 76.6% | 23.4% |
| GT_Fly | 78.5% | 21.5% |
| Undo_dancer | 72.4% | 27.6% |
| Poznan_Hall2 | 73.8% | 26.2% |
| Poznan_Street | 69.5% | 30.5% |
| Kendo | 70.6% | 29.4% |
| Balloons | 71.5% | 28.5% |
| average | 73.3% | 26.7% |

Step (3), operations are provided by following steps below: Step (3.1), the information of adoption rate found from all candidate space and time coding unit location neighboring current coding unit in step (2) provides a gist for group searching; first, the computing device may perform delete operation for neighboring candidate space and time coding unit location, delete coding unit location with minimum disparity vector adoption rate. For example, obtained adoption rate results in each location of Newspaper_CC is: adoption rates of coding unit location of reference frame in space location A1, B1, B0, A0, B2 are 65.7%, 0.9%, 3.0%, 30.1%, 0.2%, adoption rates of coding unit location CTR and BR corresponding to reference frame in time location are 76.6% and 23.4%. At last coding unit location B2 of the reference frame in space direction and unit location, BR corresponding to the reference frame in time location is deleted. Another example is: obtained adoption rate results in each location of GT fly is: adoption rates of coding unit location of reference frame in space location A1, B1, B0, A0, B2 are 66.7%, 2.1%, 6.0%, 24.2%, 1.0%, adoption rates of coding unit location CTR and BR corresponding to reference frame in time location are 78.5% and 21.5%. At last coding unit location B2 of the reference frame in space direction and unit location, BR corresponding to the reference frame in time location is deleted. Through studying the obtained adoption rate results in each location of rest testing sequences, the computing device may code unit location B2 of the reference frame in space direction and unit location BR corresponding to the reference frame in time location is deleted.

Step (3.2) rest of neighboring candidate space and time coding unit location after deletion are divided into groups, according to step (3.1): reference searching location which includes space location A1, B1, B0, A0 and time reference location CRT is obtained which is shown in FIG. 7 and FIG. 8. Grouping operation is aimed at coding unit with neighboring location, B1 next to B0, A1 next to A0, so that B1 and B0 is in a group, A1 and A0 is in another group, for example, coding unit location B2 of reference frame in space direction is deleted in Newspaper_CC sequence, so that candidate coding unit location A1, B1 form a group with neighboring A0, B0 coding unit location. Another example is: the computing device may code unit location B2 of the reference frame in space direction is deleted in GT fly sequence, so that candidate coding unit location A1, B1 forms a group with neighboring A0, B0 coding unit location. The computing device may code unit location B2 of the reference frame in space direction is deleted in rest sequences, so that candidate coding unit location A1, B1 form a group with neighboring A0, B0 coding unit location. Combination proportion of A1, A0, and B1, B0 after grouping is shown in table 3:

TABLE 3

Combination proportion of A1, A0, and B1, B0 after grouping

| | Combination proportion of A1, A0, and B1, B0 after grouping (%) | | | |
|---|---|---|---|---|
| | Group 1 | | Group 2 | |
| | A0 | A1 | B0 | B1 |
| Newspaper_CC | 31.4% | 68.6% | 76.9% | 23.1% |
| GT_Fly | 26.6% | 73.4% | 74.1% | 25.9% |
| Undo_dancer | 30.4% | 69.6% | 69.5% | 30.5% |
| Poznan_Hall2 | 34.0% | 66.0% | 70.6% | 29.4% |
| Poznan_Street | 28.7% | 71.3% | 59.1% | 40.9% |
| Kendo | 32.9% | 67.1% | 79.1% | 20.9% |
| Balloons | 32.5% | 67.5% | 78.5% | 21.5% |

Step (3.3), the computing device may use grouping information and searching location of candidate space and time coding unit neighboring current coding unit to search for neighboring disparity vector and synthesis calculation of final disparity vector. Steps are provided as follow.

Step (3.3.1) the computing device may set disparity vector symbol variate, disparity vector symbol variate indicates whether disparity vector is obtained, if it is obtained, marked as 1, if not, mark as 0. Disparity vector is set as initial (0, 0), and when coding every viewpoint; the coding order is: first using texture map coding and after that using depth map coding which is described in step (1).

Step (3.3.2) an obtaining method for neighboring disparity vector of the reference frame in the time direction is to detect whether disparity vector symbol variate is 0, if it is 0, detect CTR location corresponding to reference frame location, if disparity vector is detected, then set disparity vector symbol variate as 1.

Step (3.2.3) detection of disparity compensation prediction disparity vector in space location, the computing device may mark group (A0, A1) as 1, group (B0, B1) as 2. The obtaining method for neighboring disparity compensation prediction disparity vector inner frame in space direction is to detect whether disparity vector symbol variate is 0, if it is 0, judge A1 in group 1, if disparity compensation prediction disparity vector is found in A1, search A0 in next, judge whether disparity compensation prediction disparity vector is found, if disparity compensation prediction disparity vector is found, then the computing device may combine disparity compensation prediction disparity vector in A1 and A0, and it is used as disparity vector of A1 location based on table 3 in step (3.2), the computing device may set symbol variate as 1, for example, disparity compensation prediction disparity vector in A1 is (5, 4), disparity compensation prediction disparity vector in A0 is (4, 4), take (5, 4) multiply adoption rate (68.6%) of A1, take (4, 4) multiply adoption rate (31.4%) of A0 and add the two results together to get a new disparity vector (5, 4) of A1 location (5×68.6%+4×31.4% rounded to 5, 4×68.6%+4×31.4% rounded to 4), if disparity compensation prediction disparity vector is not found in A0, then the computing device may use disparity compensation prediction disparity vector in A1, rest of location is no need to traverse. If disparity compensation prediction disparity vector is not found in A1, then the computing device may skip A0, detect disparity compensation prediction disparity vector of B1 directly, if disparity compensation prediction disparity vector is found in B1, then judge whether disparity compensation prediction disparity vector can be found in B0, if disparity compensation prediction disparity vector is found, then the computing device may combine disparity compensation prediction disparity vector in B1 and B0 and it is used as disparity vector of B2 location based on step (3.2) table 3, the computing device may set disparity vector symbol variate as 1, for example, disparity compensation prediction disparity vector in B1 is (8, 9), disparity compensation prediction disparity vector in A0 is (7, 8), takes (8, 9) multiply adoption rate (23.1%) of B1, takes (7, 8) multiply adoption rate (76.9%) of B0 and add the two results together to get a new disparity vector (7, 8) of B1 location (8×23.1%+7×76.9% rounded to 7, 9×23.1%+8×76.9% rounded to 8). if disparity compensation prediction disparity vector is not found in B1 in group 2, then skip step (3.3.3).

Step (3.3.4), detection of motion compensation prediction disparity vector in space location, marked (A0, A1) as group 1, (B0, B1) as group 2. the obtaining method for neighboring motion compensation prediction disparity vector inner frame in space direction is to detect whether disparity vector symbol variate is 0, if is 0, judge A1 in group 1, if motion compensation prediction disparity vector is found in A1, search A0 in next, judge whether motion compensation prediction disparity vector is found, if motion compensation prediction disparity vector is found, so that combined motion compensation prediction disparity vector in A1 and A0 and it is used as disparity vector of A1 location based on step (3.2) table 3, the computing device may set symbol variate as 1, for example, motion compensation prediction disparity vector in A1 is (5, 4), motion compensation prediction disparity vector in A0 is (4, 4), takes (5, 4) multiply adoption rate (68.6%) of A1, takes (4, 4) multiply adoption rate (31.4%) of A0 and add the two results together to get a new motion vector (5, 4) of A1 location (5×68.6%+4×31.4% rounded to 5, 4×68.6%+4×31.4% rounded to 4), if motion compensation prediction disparity vector is not found in A0, then the computing device may use disparity compensation prediction disparity vector in A1, rest location is no need to traverse. If motion compensation prediction disparity vector is not found in A1, then the computing device may skip A0, detect motion compensation prediction disparity vector of B1 directly, if motion compensation prediction disparity vector is found in B1, then judge whether motion compensation prediction disparity vector can be found in B0, if motion compensation prediction disparity vector is found, then the computing device may combine motion compensation prediction disparity vector in B1 and B0, and it is used as disparity vector of B2 location based on step (3.2) table 3, set disparity vector symbol variate as 1. For example, motion compensation prediction disparity vector in B1 is (8, 9), motion compensation prediction disparity vector in A0 is (7, 8), takes (8, 9) multiply adoption rate (23.1%) of B1, takes (7, 8) multiply adoption rate (76.9%) of B0 and add the two results together to get a new motion vector (7, 8) of B1 location (8×23.1%+7×76.9% rounded to 7, 9×23.1%+8×76.9% rounded to 8). If motion compensation prediction disparity vector is not found in B1 in group 2, then skip step (3.3.4).

Step (3.3.5), judgment of deep optimization symbol, if symbol location which is marked as 1, the computing device may use deep optimization. Deep optimization is existing technology (defined by DoNBDV in reference 1). At first, texture block which is pointed by final disparity vector, such as final disparity vector is (3, 4), the current location of texture block is (1, 2) which is pointed to texture location (4, 6) (3+1=4, 4+2=6). Searching depth value of 4 corners in depth block and choosing the max value, at last, the computing device may take this max value transform into disparity vector after deep optimization; transform equation is expressed using the following equation.

$$\vec{D} = f \cdot l \left( \frac{d_{max}}{255} \cdot \left( \frac{1}{\vec{Z}_{near}} - \frac{1}{\vec{Z}_{far}} \right) + \frac{1}{\vec{Z}_{far}} \right)$$

$\vec{D}$ represents disparity vector after deep optimization, f represents focal length value of video camera, l represents parallax range, $d_{max}$ represents the max depth value of 4 corners in pixel location, $\vec{Z}_{near}$ and $\vec{Z}_{far}$ represent the nearest and furthest location coordinates of a video camera, f and l are fixed-parameter in video camera parameter form.

The present disclosure disclosed a method of changing the standard that taking disparity vector which is first searched as final disparity vector. The origin method through deleting searching candidate location and decreasing searching times which leads to bad quality of coding, the present disclosure make it better, coding quality is improved at least 0.05% and at the same time maintaining origin fast algorithm efficiency firstly (decoding time is decreased to 97.1%, the time of coding and virtual viewpoint synthesis is not change).

TABLE 4

The results of testing sequences in the present disclosure compare with fast algorithm in HTM8.0

| | video0 | video1 | video2 | video PSNR/video bitrate | video PSNR/total bitrate | Synth PSNR/total bitrate | Enc time | Dec time | Ren time |
|---|---|---|---|---|---|---|---|---|---|
| Newspaper_CC | 0.00% | −0.16% | −0.21% | −0.08% | −0.04% | −0.35% | 100.0% | 96.2% | 100.0% |
| GT_Fly | 0.00% | 0.08% | −0.09% | 0.01% | 0.00% | 0.01% | 100.1% | 99.0% | 101.3% |
| Undo_dancer | 0.00% | −0.09% | 0.03% | −0.02% | −0.01% | −0.03% | 99.8% | 100.1% | 99.1% |
| Poznan_Hall2 | 0.00% | 0.05% | 0.21% | 0.03% | 0.03% | 0.06% | 100.1% | 98.2% | 100.2% |
| Poznan_Street | 0.00% | −0.31% | −0.05% | −0.06% | −0.06% | −0.03% | 100.1% | 99.0% | 101.3% |
| Kendo | 0.00% | 0.10% | −0.06% | 0.02% | 0.02% | 0.04% | 100.1% | 95.2% | 100.0% |
| Balloons | 0.00% | −0.04% | −0.03% | −0.03% | −0.02% | 0.01% | 99.6% | 92.1% | 98.2% |
| 1024 * 768 | 0.00% | −0.03% | −0.1% | −0.03% | −0.01% | −0.1% | 99.9% | 94.5% | 99.4% |
| 1920 * 1088 | 0.00% | −0.07% | 0.03% | −0.01% | −0.01% | 0.00% | 100.0% | 99.1% | 100.5% |
| average | 0.00% | −0.05% | −0.03% | −0.02% | −0.01% | −0.04% | 100.0% | 97.1% | 100.0% |

DETAILED DESCRIPTION OF THE PREFERRED EMBODIMENTS

Figure 1:
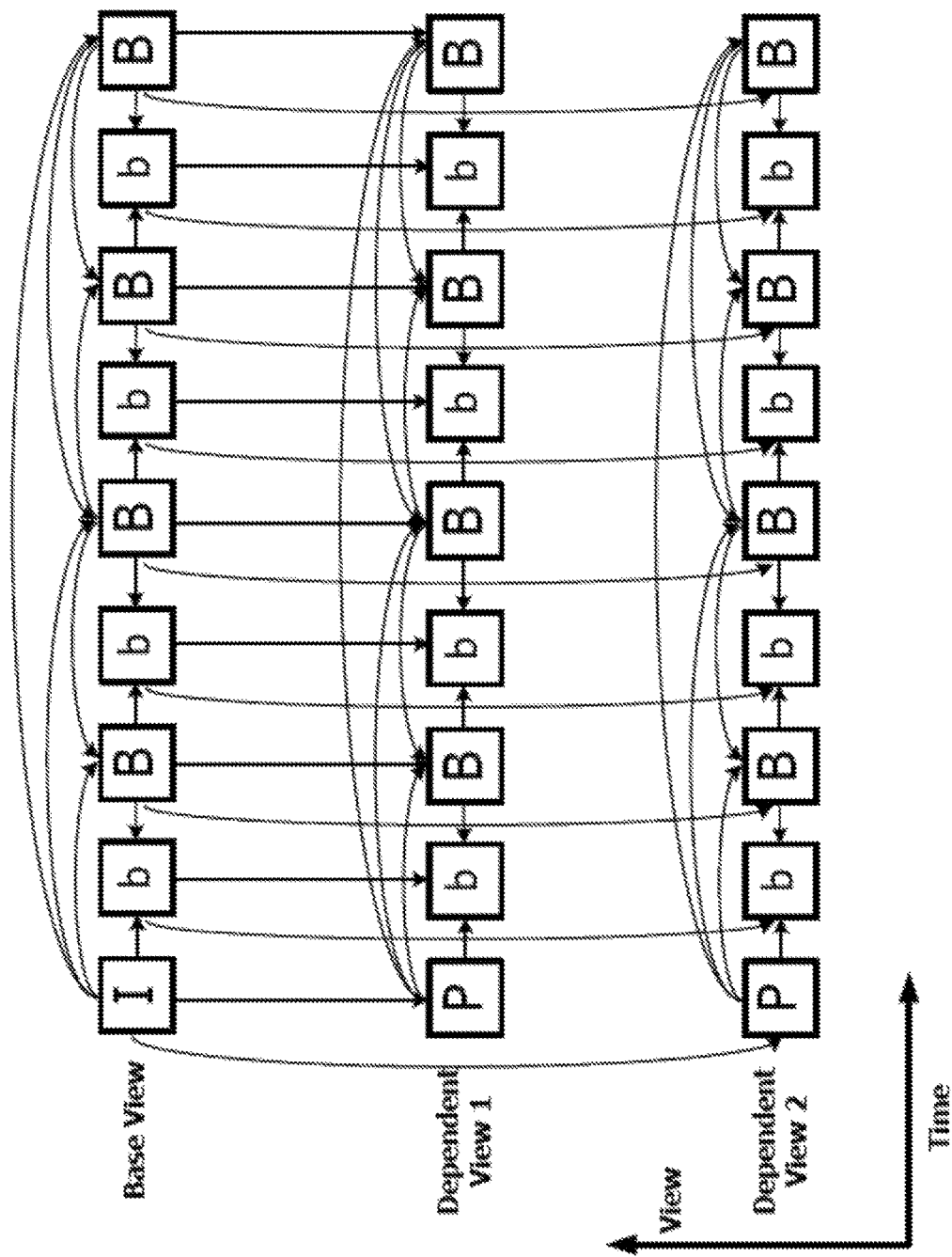
FIG. 1 illustrates a structure map of prediction Coding in 3D-HEVC.
Figure 2:
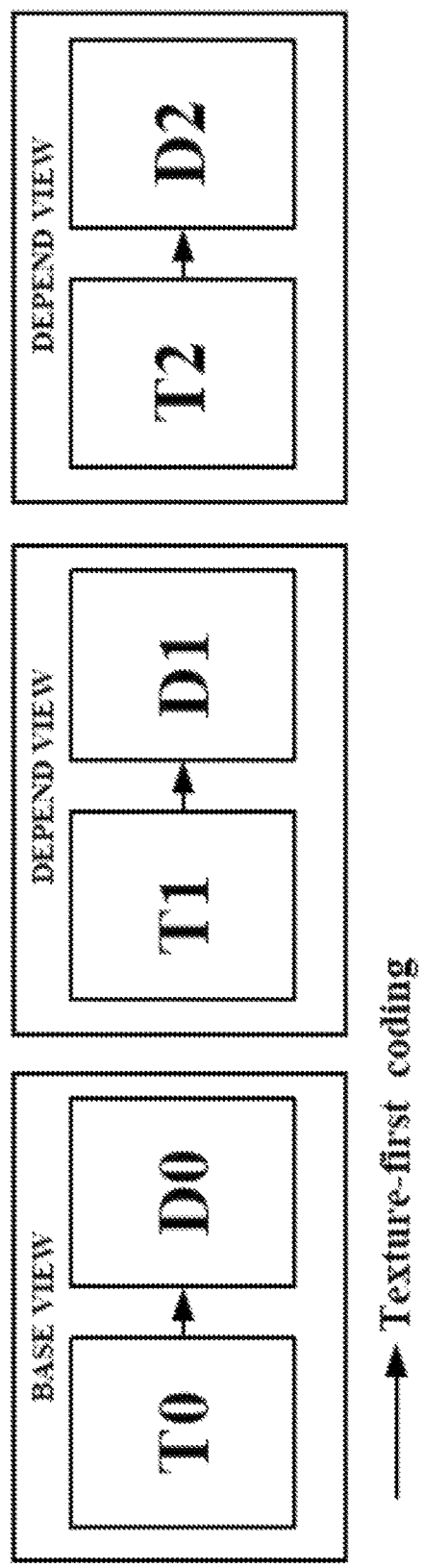
FIG. 2 illustrates a texture map prior coding order map.
Figure 3:
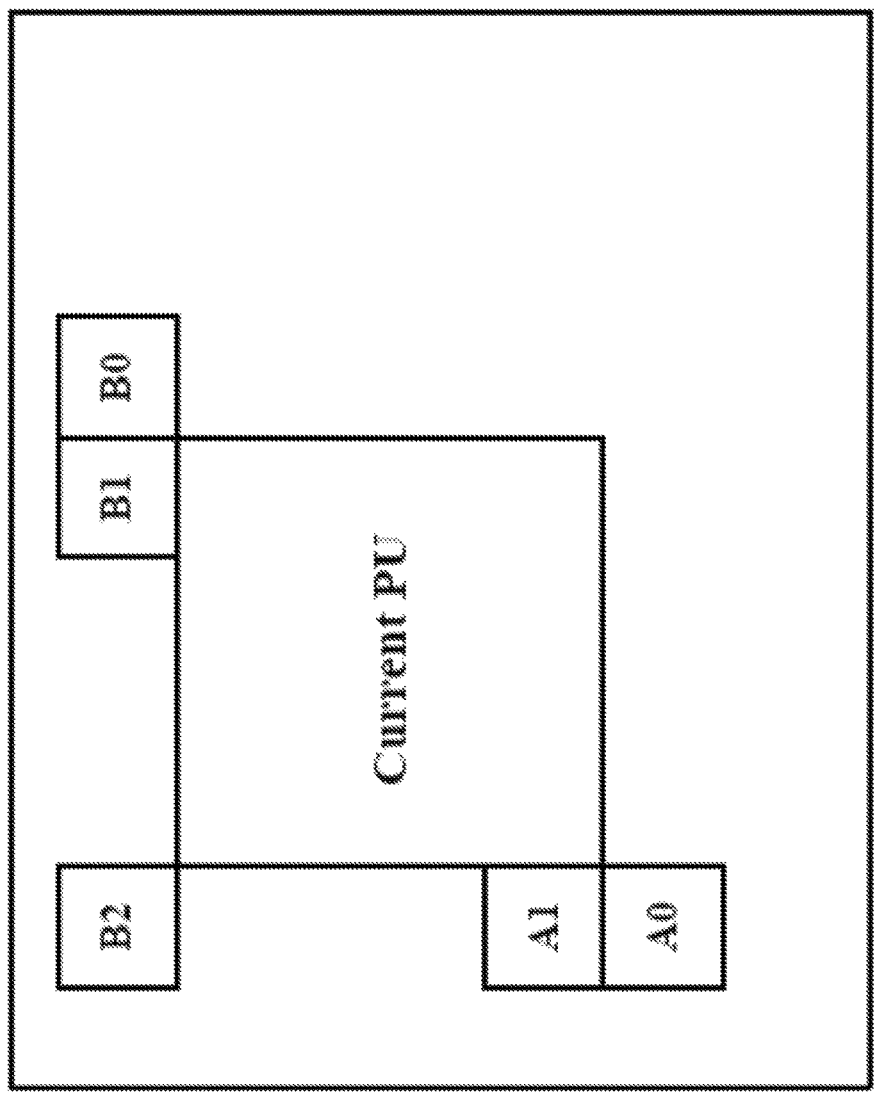
FIG. 3 illustrates a location map of a candidate space coding block based on disparity vector obtaining method between neighboring block
Figure 4:
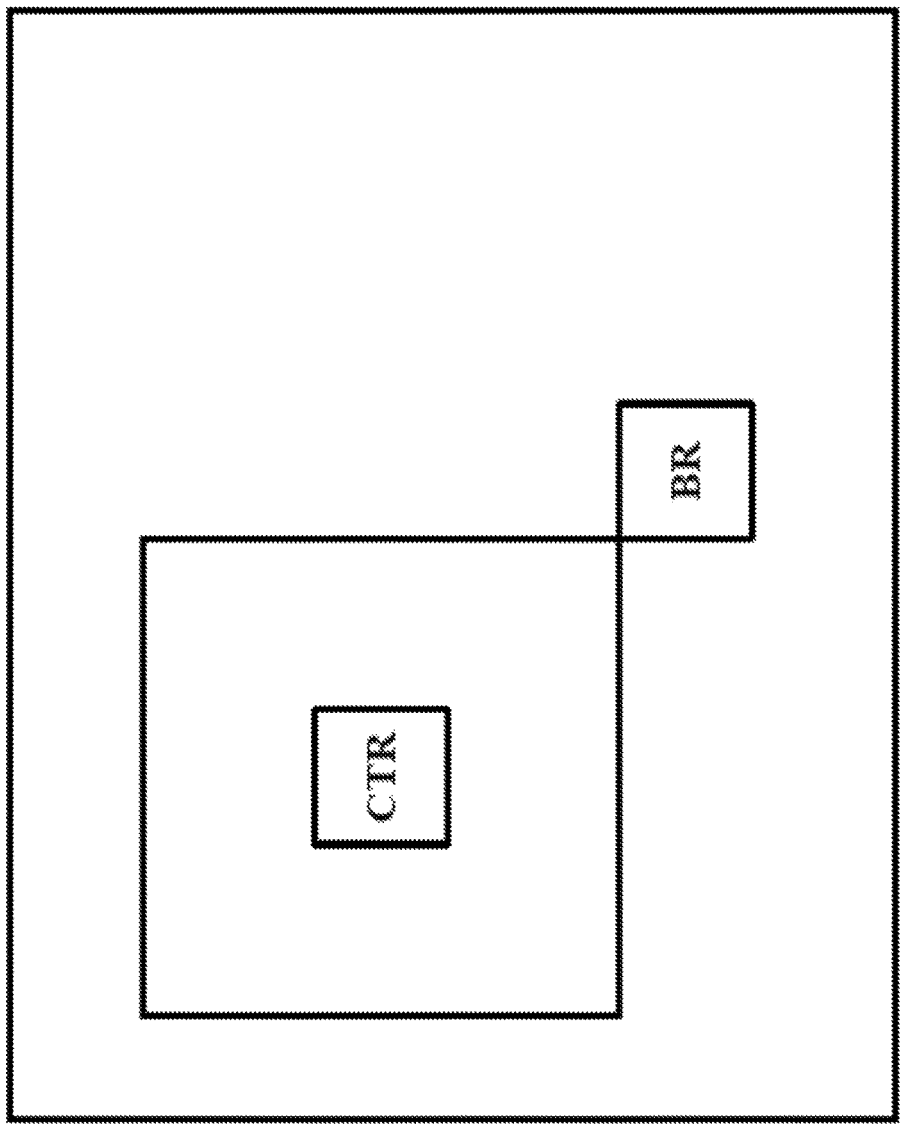
FIG. 4 illustrates a location map of a candidate time coding block based on disparity vector obtaining method between neighboring block.
Figure 5:
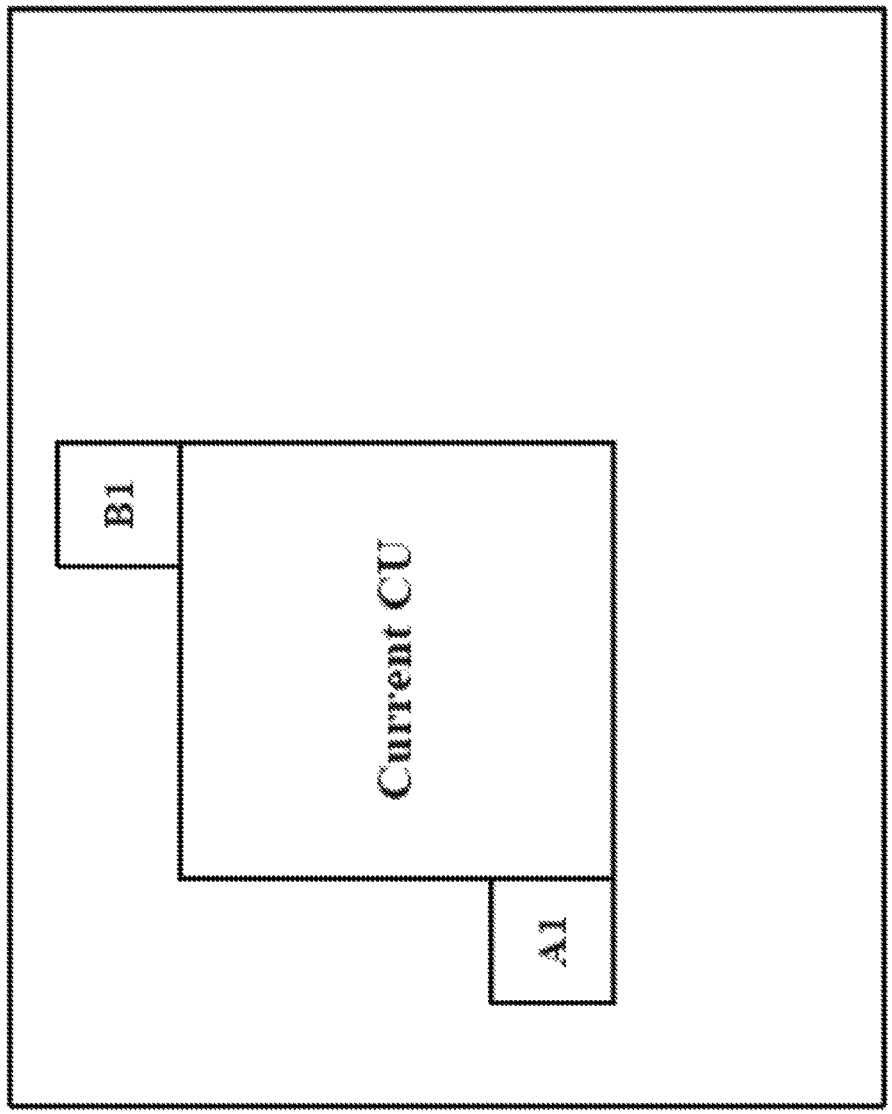
FIG. 5 illustrates a location map of a candidate space coding block based on deleting method.

To solve the problem above, the technical scheme used in the present disclosure is a new method to get the neighbor block disparity vector in 3D-HEVC using a computing device may. At first, the computing device may extract information of disparity vector adoption rate of candidate time and space coding unit location neighboring with current coding unit in encoded coding unit of current coding viewpoint, and then through deleting the location which is minimum searched in neighboring candidate space and time coding unit location, at the same time, group neighboring candidate space and time coding unit location, the approach takes searched disparity vector which is combined according to the proportion of adoption rate as final disparity vector. The present disclosure may change the standard that taking disparity vector which is first searched as final disparity vector, and change the bad quality of coding through using origin method due to deleting searching candidate location and decreasing searching times, and coding quality are improved and at the same time maintaining origin fast algorithm efficiency firstly.

The method of extracting information of disparity vector adoption rate of candidate time and space coding unit location neighboring with the current coding unit in an encoded coding unit of a current coding viewpoint is provided as follow.

1.1 Using HTM8.0 treat 3D-HEVC international video testing sequence standard Newspaper_CC, GT fly, Undo dancer, Poznan_Hall2, Poznan_Street, Kendo, Balloons, select first "n" frame base viewpoint and dependent viewpoint described before to code, n is nature number and 40≤n≤60, the coding order for each viewpoint is: first using texture map coding and after that using depth map coding, during the coding process of first n frame, using entire location searching method for the location of candidate space and time coding unit neighboring with current coding unit, while at the same time, the computing device may extract information of disparity vector adoption rate of candidate space and time coding unit next to current coding unit, includes: detection of whether CTR, BR of candidate time coding location and A1, B1, B0, A0, B2 of candidate space coding location have disparity vector or disparity vector form motion compensation prediction, the information of disparity vector or disparity vector form motion compensation prediction is found from all candidate space and time coding unit neighboring current coding unit, calculate the sum-of-squared differences of disparity reference frame corresponding to this information above, according to the information of sum-of-squared differences to count disparity vector adoption rate found from all candidate space and time coding unit location neighboring with current coding unit. Finally, the counting result of each location is shown in table 1 and table 2.

The present disclosure provides a method to get neighbor disparity vector and specifically provides that the computing device may delete the location which is minimum searched in neighboring candidate space and time coding unit location, and, at the same time, group neighboring candidate space and time coding unit location by the following steps.

2.1 The information of adoption rate is found from all candidate space and time coding unit location neighboring with current coding unit provides a gist for group searching, first; the computing device may doing delete operation for neighboring candidate space and time coding unit location, delete coding unit location with minimum disparity vector adoption rate. The counting result of each location is shown in table 1 and table 2.

Figure 7:
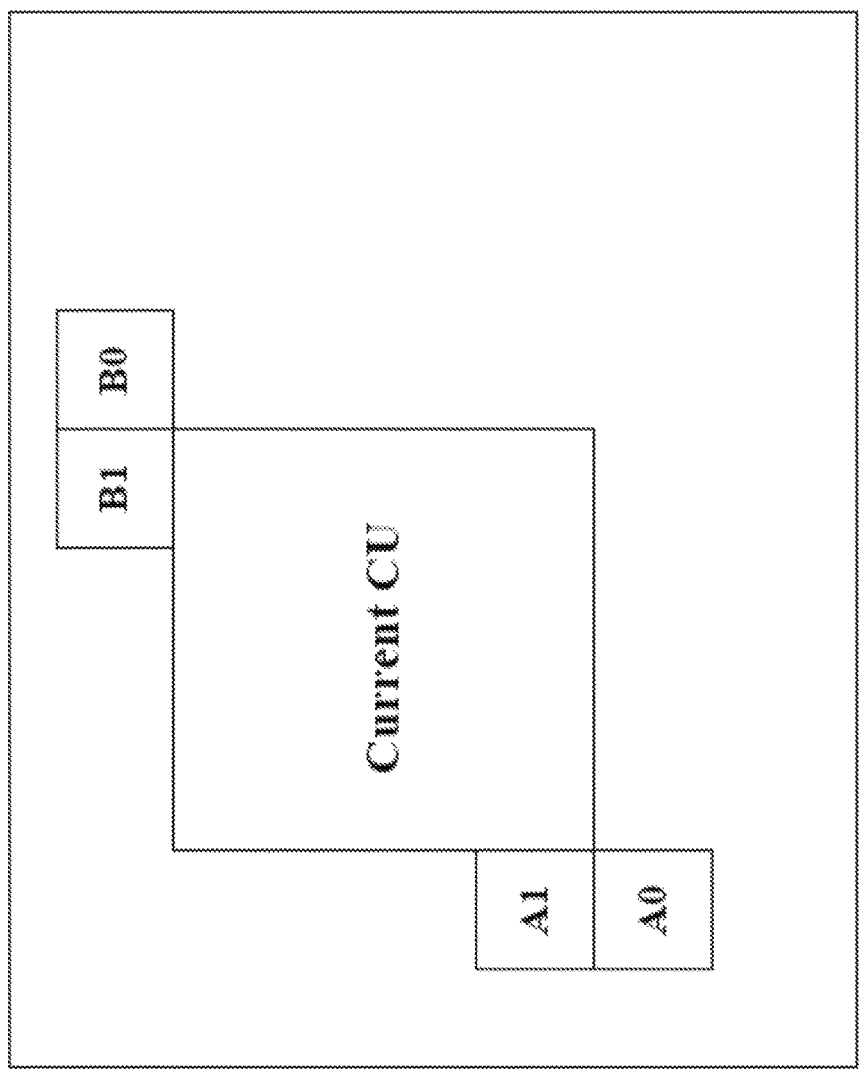
FIG. 7 illustrates a location map of a candidate space coding block in the present disclosure.
Figure 8:
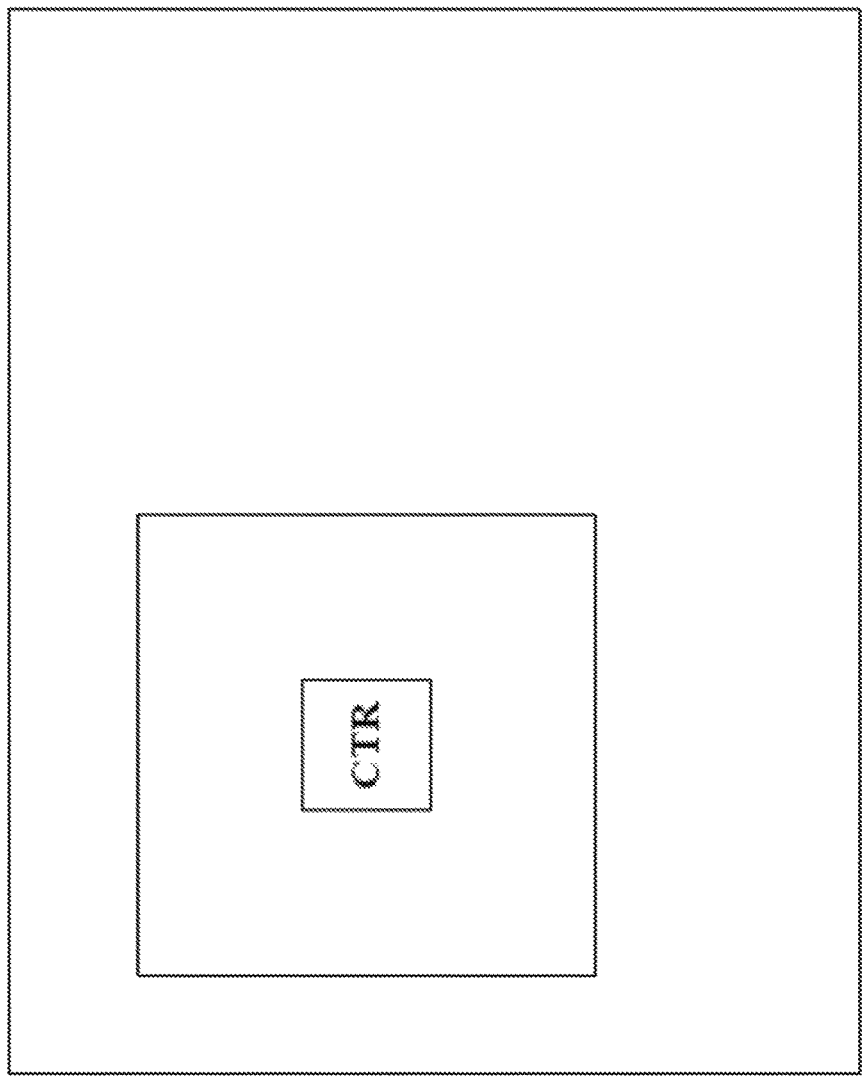
FIG. 8 illustrates a location map of a candidate time coding block in the present disclosure.
Figure 9:
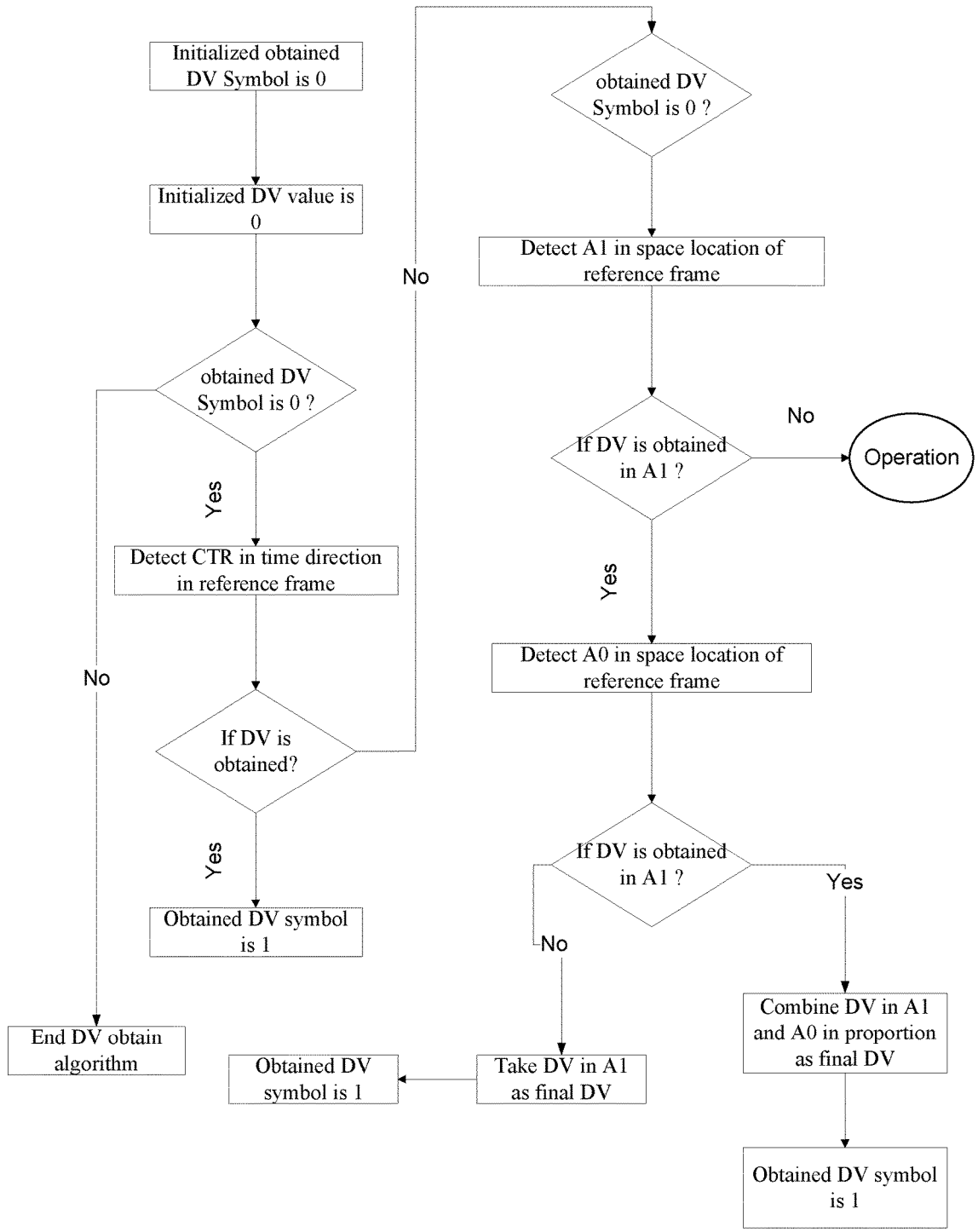
FIG. 9 illustrates a flow chart of the present disclosure.
Figure 9:
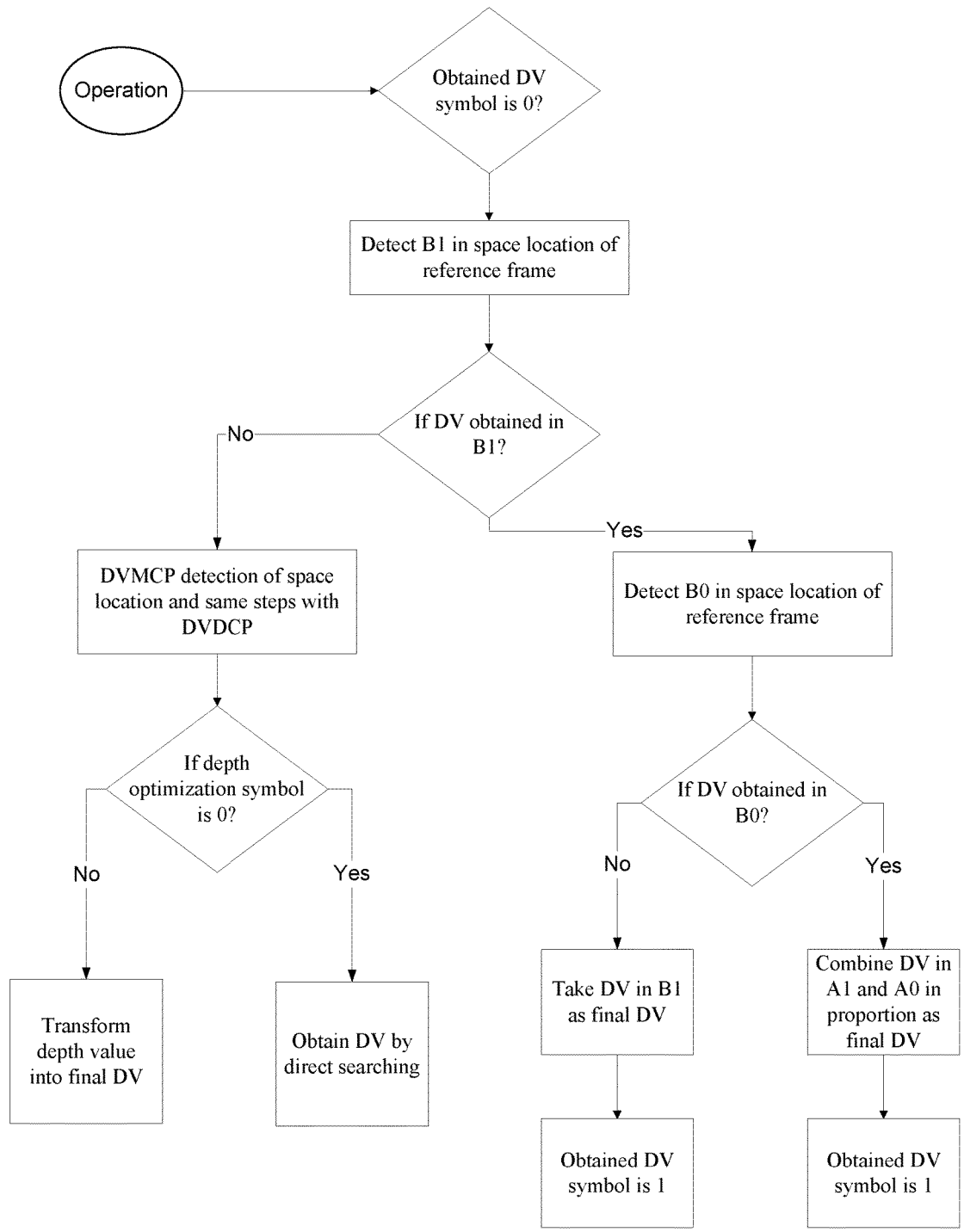

2.2 Rest of neighboring candidate space and time coding unit location after deletion are divided into groups, through step (2.1), reference searching location which includes space location A1, B1, B0, A0 and time reference location CRT is obtained which are shown in FIG. 7 and FIG. 8. The grouping operation is aimed at the coding unit with the neighboring location, B1 next to B0, A1 next to A0, so that B1 and B0 are in a group, A1 and A0 are in another group. The combined proportion of A1, A0, and B1, B0 after grouping is shown in table 3.

The present disclosure provides a method to get neighbor disparity vector and specifically provides that the computing device may use searching location of candidate time and space coding unit neighboring with current coding unit and grouping information to search neighboring disparity vector and synthesis final disparity vector by the following steps.

3.1 Setting disparity vector symbol variate, disparity vector symbol variate indicates whether disparity vector is obtained, if it is obtained, marked as 1, if not, marked as 0. Disparity vector is set as initial (0, 0), and when coding every viewpoint, the coding order is: first using texture map coding and after that using depth map coding which is described in step (1.1).

3.2 The obtaining method for neighboring disparity vector of the reference frame in the time direction is to detect whether disparity vector symbol variate is 0, if it is 0, the computing device may detect CTR location corresponding to reference frame location if disparity vector is detected, then set disparity vector symbol variate as 1.

3.3 Detection of disparity compensation prediction disparity vector in space location, marked group (A0, A1) as 1, group (B0, B1) as 2. The obtaining method for neighboring disparity compensation prediction disparity vector inner frame in space direction is to detect whether disparity vector symbol variate is 0, if it is 0, the computing device may judge A1 in group 1, if disparity compensation prediction disparity vector is found in A1, search A0 in next, judge whether disparity compensation prediction disparity vector is found, if disparity compensation prediction disparity vector is found, then the computing device may combine disparity compensation prediction disparity vector in A1 and A0 and it is used as disparity vector of A1 location based on step (2.2) table 3, set symbol variate as 1, if disparity compensation prediction disparity vector is not found in A0, use disparity compensation prediction disparity vector in A1 location to find program termination and jump out, the rest of location may be ignored. If disparity compensation prediction disparity vector is found, then the computing device may combine disparity compensation prediction disparity vector in B1 and B0, and it is used as disparity vector of B2 location based on step (2.2) table 3, set disparity vector symbol variate as. If disparity compensation prediction disparity vector is not found in B1 in group 2, then skip step (3.3).

3.4 Detection of motion compensation prediction disparity vector in space location, marked (A0, A1) as group 1, (B0, B1) as group 2. The obtaining method for neighboring motion compensation prediction disparity vector inner frame in space direction is, the computing device may detect whether disparity vector symbol variate is 0, if it is 0, judge A1 in group 1, if motion compensation prediction disparity vector is found in A1, search A0 in next, judge whether motion compensation prediction disparity vector is found, if motion compensation prediction disparity vector is found, then the computing device may combine motion compensation prediction disparity vector in A1 and A0 and it is used as disparity vector of A1 location based on step (2.2) table 3, set symbol variate as 1. If motion compensation prediction disparity vector is not found in A0, the computing device may use motion compensation prediction disparity vector in A1 to find program termination and jump out, rest of location is no need to traverse. If motion compensation prediction disparity vector is not found in A1, then the computing device may skip A0, detect motion compensation prediction disparity vector of B1 directly, if motion compensation prediction disparity vector is found in B1, then judge whether motion compensation prediction disparity vector can be found in B0, if motion compensation prediction disparity vector is found, then the computing device may combine motion compensation prediction disparity vector in B1 and B0, and it is used as disparity vector of B2 location based on step (2.2) table 3, set disparity vector symbol variate as 1. If motion compensation prediction disparity vector is not found in B1 in group 2, then the computing device may skip step (3.4).

3.5 Judgment of deep optimization symbol, if symbol location which is marked as 1, the computing device may use deep optimization. Deep optimization is existed technology described by DoNBDV in reference 1. At first, texture block which is pointed by final disparity vector, and depth block corresponding to texture block which is pointed by final disparity vector, the computing device may search depth value of 4 corners in depth block and choose the max value. At last, take this max value transform into disparity vector after deep optimization, transform equation is expressed using the following equation.

$$\vec{D} = f \cdot l \left( \frac{d_{max}}{255} \cdot \left( \frac{1}{\vec{Z}_{near}} - \frac{1}{\vec{Z}_{far}} \right) + \frac{1}{\vec{Z}_{far}} \right)$$

$\vec{D}$ represents disparity vector after deep optimization, f represents focal length value of video camera, l represents parallax range, $d_{max}$ represents the max depth value of 4 corners in pixel location, $\vec{Z}_{near}$ and $\vec{Z}_{far}$ represent the nearest and furthest location coordinates of a video camera, f and l are fixed-parameter in video camera parameter form.

In reality, at first, the computing device may load 3D-HEVC video sequence with more texture and depth, the format of video sequence input is YUV, after video data is loaded by computer, first, the computing device may use HTM8.0 more texture and depth 3D-HEVC encoding software to encode base viewpoint and dependent viewpoint of the sequence, while at the same time, extract information of adoption rate of disparity vector in candidate time and space coding unit location neighboring with current coding unit, the computing device may divide neighboring candidate time and space coding unit location into groups, and then, use the method disclosed in the present disclosure to finish encoding process.

Figure 6:
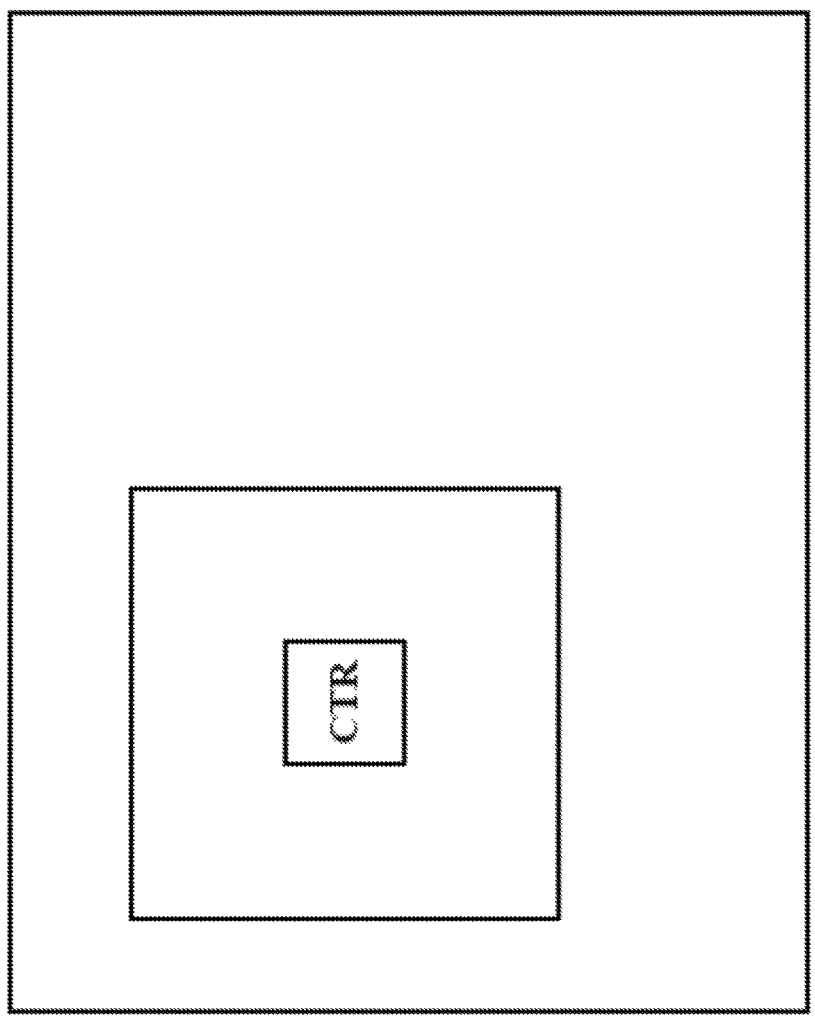
FIG. 6 illustrates a location map of a candidate time coding block based on deleting method.

The present disclosure aims at macro blocks of all frames of video dependent viewpoint with more texture and depth, designs a method to get neighbor disparity vector in a coding unit of dependent viewpoint. FIG. 6 is the flow chart of this method, the process including following steps.

Video sequences used in the present disclosure is international testing video sequence with more texture and depth, which are: Newspaper_CC, GT fly, Undo dancer, Poznan_Hall2, Poznan_Street, Kendo, Balloons, the computing device may select base viewpoint and dependent viewpoint of first "n" frame described before to code, n is nature number and 40≤n≤60. At first using HTM8.0 to do entire location searching for the location of candidate space and time coding unit next to current coding unit to get information about disparity vector adoption rate of candidate space and time coding unit next to current coding unit, and then using the information of disparity vector adoption rate to delete the location which is minimum searched in neighboring candidate space and time coding unit location, at the same time, grouping neighboring candidate space and time coding unit location, the approach takes searched disparity vector which is combined according to the proportion of adoption rate as final disparity vector, at last using method in the present disclosure to get disparity vector of neighboring dependent viewpoint of the rest sequence; the present disclosure changes the bad quality of coding through using origin method due to delete searching candidate location and decreasing searching times, coding quality is improved and at the same time maintaining origin fast algorithm efficiency firstly.

In a specific process, the following steps may be implemented by a computing device.

Step 1, the computing device may use HTM8.0 to treat 3D-HEVC standard international video testing sequence Newspaper_CC, GT fly, Undo dancer, Poznan_Hall2, Poznan_Street, Kendo, Balloons, select base viewpoint and dependent viewpoint of first "n" frame described before to code, n is nature number and 40≤n≤60, the coding order for each viewpoint is: first using texture map coding and after that using depth map coding. During the coding process of first n frame, using entire location searching method for the location of candidate space and time coding unit neighboring with current coding unit, while at the same time, extract information of disparity vector adoption rate of candidate space and time coding unit neighboring with current coding unit, includes: detection of whether CTR, BR of candidate time coding location and A1, B1, B0, A0, B2 of candidate space coding location have disparity vector or disparity vector form motion compensation prediction, the information of disparity vector or disparity vector form motion compensation prediction is found from all candidate space and time coding unit neighboring with current coding unit, calculate the sum-of-squared differences of disparity reference frame corresponding to this information above, according to the information of sum-of-squared differences to count disparity vector adoption rate found from all candidate space and time coding unit location neighboring with current coding unit. At last the counting results of adoption rate in each location are shown in table 1 and table 2.

Step 2, the information of adoption rate may be found from all candidate space and time coding unit location neighboring with current coding unit in former step provides a gist for group searching; first, the computing device may perform delete operation for neighboring candidate space and time coding unit location, delete coding unit location with minimum disparity vector adoption rate. The counting results of adoption rate in each location are shown in table 1 and table 2.

Step 3, the rest of neighboring candidate space and time coding unit location after deletion in former step are divided into groups, reference searching location which includes space location A1, B1, B0, A0 and time reference location CRT is obtained through step 2 which are shown in FIGS. 7 and 8. The grouping operation is aimed at the coding unit with the neighboring location, B1 next to B0, A1 next to A0, so that B1 and B0 are in a group, A1 and A0 are in another group. The combined proportion after grouping process of A1, A0 and B1, B0 is shown in table 3.

Step 4, the computing device may set disparity vector symbol variate, disparity vector symbol variate indicates whether disparity vector is obtained, if it is obtained, the computing device may mark as 1, if not, marked as 0. Disparity vector is set as initial (0, 0), and when coding every viewpoint, the coding order is: first using texture map coding and after that using depth map coding which is described in step 1.

Step 5, the obtaining method for neighboring disparity vector of the reference frame in the time direction is to detect whether disparity vector symbol variate is 0, if it is 0, the computing device may detect CTR location corresponding to reference frame location, if disparity vector is detected, then set disparity vector symbol variate as 1.

Step 6, detection of disparity compensation prediction disparity vector in space location, the computing device may mark group (A0, A1) as 1, group (B0, B1) as 2. The obtaining method for neighboring disparity compensation prediction disparity vector inner frame in space direction is to detect whether disparity vector symbol variate is 0, if it is 0, the computing device may judge A1 in group 1, if disparity compensation prediction disparity vector is found in A1, search A0 in next, judge whether disparity compensation prediction disparity vector is found, if disparity compensation prediction disparity vector is found, then the computing device may combine disparity compensation prediction disparity vector in A1 and A0 and it is used as disparity vector of A1 location based on step 3 table 3, set symbol variate as 1, if disparity compensation prediction disparity vector is not found in A0, use disparity compensation prediction disparity vector in A1 location to find program termination and jump out, rest of location is no need to traverse. If disparity compensation prediction disparity vector is not found in A1, then the computing device may skip A0, detect disparity compensation prediction disparity vector of B1 directly, if disparity compensation prediction disparity vector is found in B1, then the computing device may judge whether disparity compensation prediction disparity vector can be found in B0, if disparity compensation prediction disparity vector is found, then the computing device may combine disparity compensation prediction disparity vector in B1 and B0, and it is used as disparity vector of B2 location based on step 3 table 3, set disparity vector symbol variate as 1. If disparity compensation prediction disparity vector is not found in B1 in group 2, then skip this step.

Step 7, detection of motion compensation prediction disparity vector in space location, the computing device may mark (A0, A1) as group 1, (B0, B1) as group 2. The obtaining method for neighboring motion compensation prediction disparity vector inner frame in space direction is to detect whether disparity vector symbol variate is 0, if it is 0, judge A1 in group 1, if motion compensation prediction disparity vector is found in A1, search A0 in next, judge whether motion compensation prediction disparity vector is found, if motion compensation prediction disparity vector is found, then the computing device may combine motion compensation prediction disparity vector in A1 and A0, and it is used as disparity vector of A1 location based on step 3 table 3, set symbol variate as 1. If motion compensation prediction disparity vector is not found in A0, the computing device may use motion compensation prediction disparity vector in A1 to find program termination and jump out, rest of location is no need to traverse. If motion compensation prediction disparity vector is not found in A1, then the computing device may skip A0, detect motion compensation prediction disparity vector of B1 directly, if motion compensation prediction disparity vector is found in B1, then judge whether motion compensation prediction disparity vector can be found in B0, if motion compensation prediction disparity vector is found, then the computing device may combine motion compensation prediction disparity vector in B1 and B0, and it is used as disparity vector of B2 location based on step 3 table 3, set disparity vector symbol variate as 1. If motion compensation prediction disparity vector is not found in B1 in group 2, then skip this step.

Step 8, judgment of deep optimization symbol, if symbol location which is marked as 1, the computing device may use deep optimization. Deep optimization is an existed technology and defined by DoNBDV in reference 1. At first, texture block which is pointed by final disparity vector, and depth block corresponding to texture block which is pointed by final disparity vector, searching depth value of 4 corners in depth block and choosing the max value; at last, the computing device may take this max value transform into disparity vector after deep optimization, transform equation is expressed using the following equation.

$$\vec{D} = f \cdot l \left( \frac{d_{max}}{255} \cdot \left( \frac{1}{\vec{Z}_{near}} - \frac{1}{\vec{Z}_{far}} \right) + \frac{1}{\vec{Z}_{far}} \right)$$

$\vec{D}$ represents disparity vector after deep optimization, f represents focal length value of video camera, l represents parallax range, $d_{max}$ represents the max depth value of 4 corners in pixel location, $\vec{Z}_{near}$ and $\vec{Z}_{far}$ represent the nearest and furthest location coordinates of a video camera, f and l are fixed-parameter in video camera parameter form.

The present disclosure changes the standard that taking disparity vector which is first searched as final disparity vector, changes the bad coding quality of origin method through deleting searching candidate location and decrease searching times; coding quality is improved while at the same time maintaining origin fast algorithm efficiency firstly. Results of testing sequences as compared to the current fast algorithm are shown in table 4.

What is claimed is:

1. A method of acquiring neighboring disparity vectors for multi-texture and multi-depth video, the method comprising:
    pre-encoding, by one or more processors of a computer, base viewpoints and current dependent viewpoints of a selected sequence based on a general testing condition using 3D-HEVC coding software as a coding platform;
    dividing, by the one or more processors, multiple quantified parameters into multiple groups based on a texture map and a corresponding depth map that are specified by the general testing condition, each group having an indicator representing a texture map quantified parameter and an indicator representing a depth map quantified parameter based on a general testing condition;
    selecting, by the one or more processors, multiple frames of the base viewpoints and current dependent viewpoints such that each of the base viewpoints and current dependent viewpoints is encoded in an order from texture map encoding and then depth map encoding, a number of the multiple frames is neither less than 40 nor greater than 60;
    identifying, by the one or more processors, time and space candidate coding units next to the current coding unit with respect to the multiple frames;
    extracting, by the one or more processors, disparity vector adoption rates of the space and time candidate coding units based on disparity vector adoption rates of time and space candidate coding units that are next to the current coding unit, the disparity vector adoption rate indicating whether a candidate time coding location and candidate space coding locations have a disparity vector or disparity vectors from motion compensation predictions; and
    obtaining, by the one or more processors, the neighboring disparity vectors based on the extracted disparity vector adoption rates for the neighboring disparity vectors for multi-texture and multi-depth video by performing acts comprising:
        collecting, by the one or more processors, the disparity vector adoption rates of the space and time candidate coding units to determine grouping information and searching locations of the space and time candidate coding units,
        searching and obtaining, by the one or more processors, the neighboring disparity vector of the current coding unit based on the determined the grouping information and searching locations, and
        calculating and optimizing, by the one or more processors, the neighboring disparity vectors for the multi-texture and multi-depth video based on the neighboring disparity vector of the current coding unit using equation:

$$\vec{D} = f \cdot l \left( \frac{d_{max}}{255} \cdot \left( \frac{1}{\vec{Z}_{near}} - \frac{1}{\vec{Z}_{far}} \right) + \frac{1}{\vec{Z}_{far}} \right),$$

wherein $\vec{D}$ represents disparity vectors after deep optimization, f represents a focal length value of a video camera, l represents a parallax range, $d_{max}$ represents a max depth value of 4 corners in a pixel location, $\vec{Z}_{near}$ and $\vec{Z}_{far}$ represent the nearest and furthest location coordinates of the video camera, and f and l are fixed-parameters in video camera parameter forms.

* * * * *